United States Patent [19]

Hughes

[11] Patent Number: 5,148,389

[45] Date of Patent: Sep. 15, 1992

[54] MODULAR EXPANSION BUS CONFIGURATION

[75] Inventor: Jodie K. Hughes, San Jose, Calif.

[73] Assignee: Convergent Technologies, Inc., San Jose, Calif.

[21] Appl. No.: 177,704

[22] Filed: Apr. 5, 1988

[51] Int. Cl.$^5$ ............................................. G06F 13/00
[52] U.S. Cl. .............................. 395/800; 364/970.5; 364/942.51; 364/DIG. 2
[58] Field of Search ... 364/200 MS File, 900 MS File

[56] References Cited

U.S. PATENT DOCUMENTS

| 4,468,729 | 8/1984  | Schwartz      | 364/200    |
|-----------|---------|---------------|------------|
| 4,701,878 | 10/1987 | Günkel et al. | 364/900    |
| 4,727,475 | 2/1988  | Kiremidjian   | 364/200    |
| 4,760,553 | 7/1988  | Buckley et al.| 364/900    |
| 4,849,752 | 7/1989  | Bryant        | 340/825.52 |
| 4,951,248 | 8/1990  | Lynch         | 364/900    |

Primary Examiner—Gareth D. Shaw
Assistant Examiner—Maria Napiorkowski
Attorney, Agent, or Firm—Townsend & Townsend

[57] ABSTRACT

A technique for assigning addresses to modular units connected to a computer system expansion bus. A unique address is initially generated in a controller module attached to the expansion bus and is transferred to the first one of several serially coupled expansion modules. The first modules receives the unique address which now identifies that module and generates a new unique address from the received unique address. The new unique address is transferred to the next expansion module which uses the received address to identify itself. The steps are repeated until each expansion module has received a unique address to identify itself. In each module, a Read Only Memory (ROM) is used to receive the unique address from the previous module and to generate a new address for the next module.

8 Claims, 5 Drawing Sheets

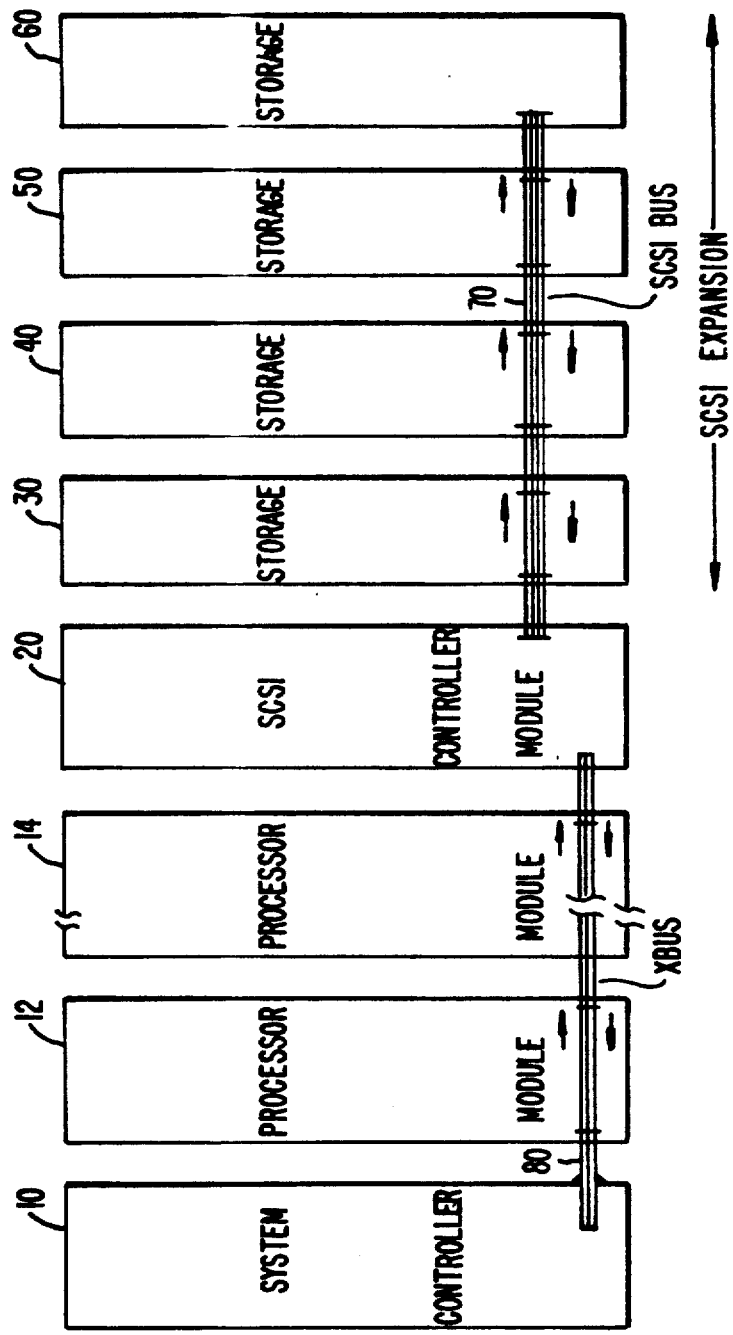
FIG._1 (PRIOR ART)

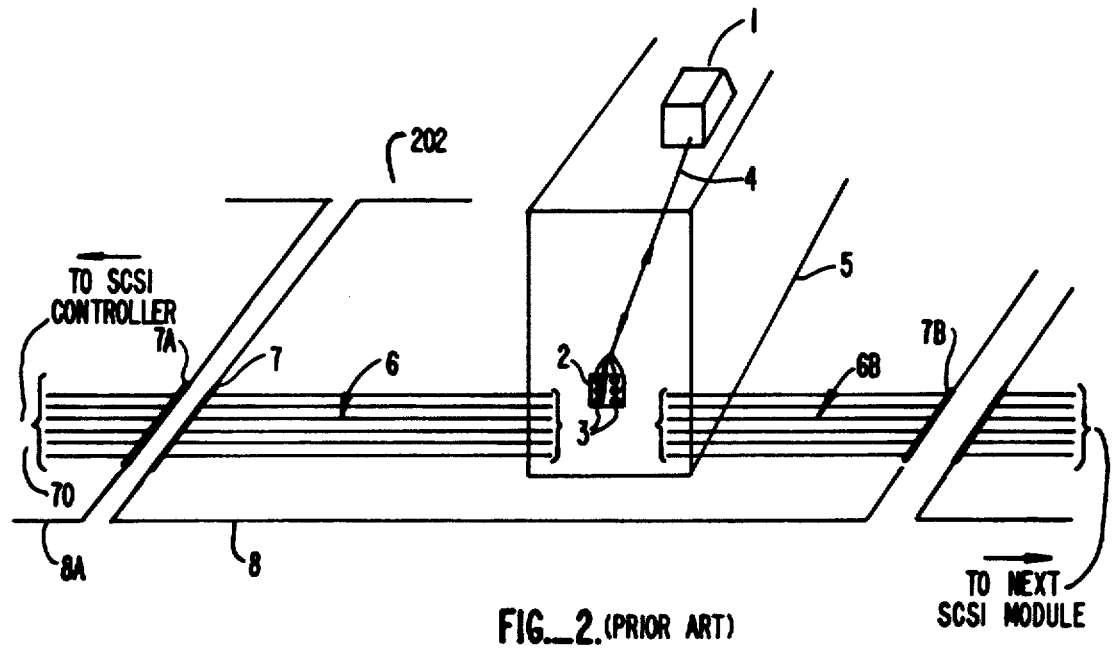
FIG._2.(PRIOR ART)
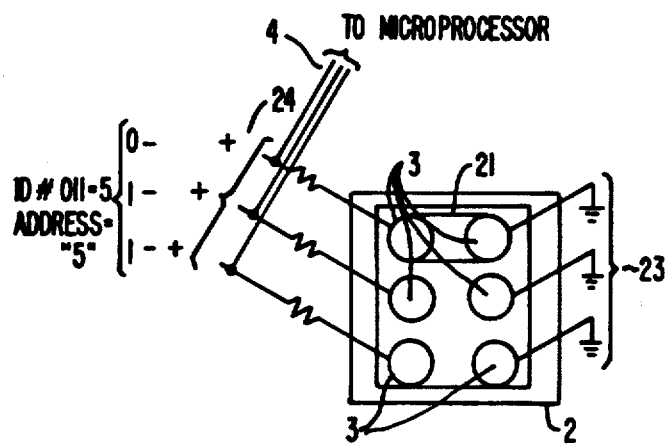
FIG._3.(PRIOR ART)

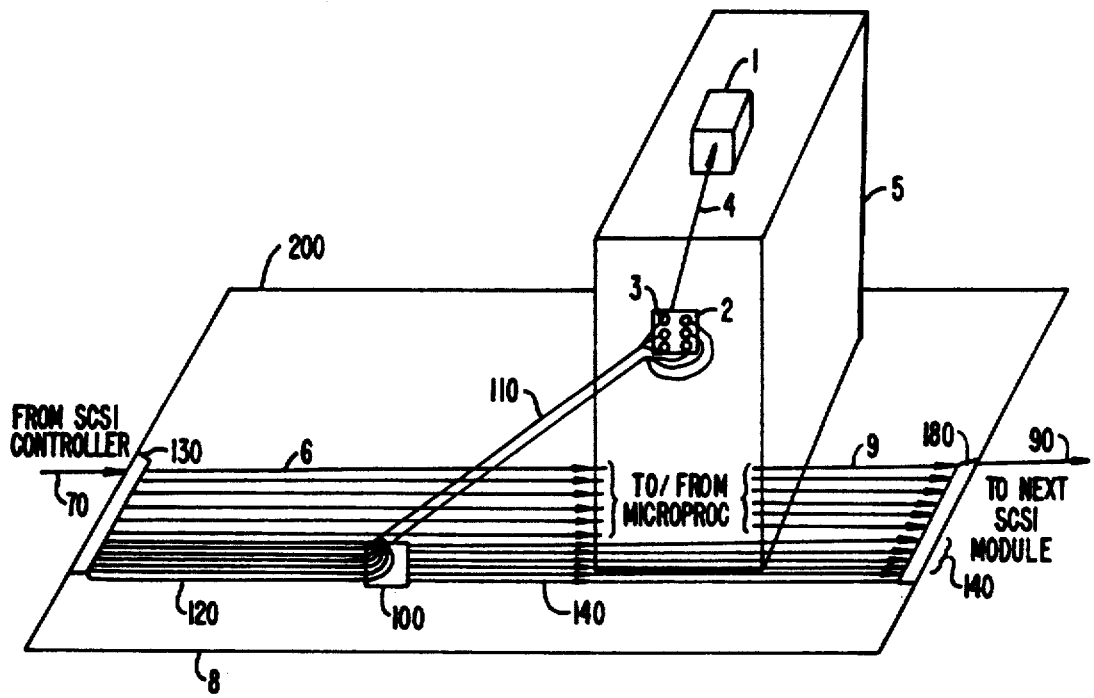
FIG._4.
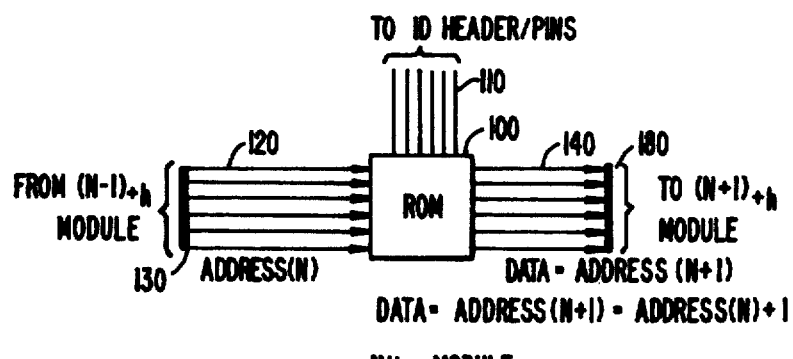
FIG._5.

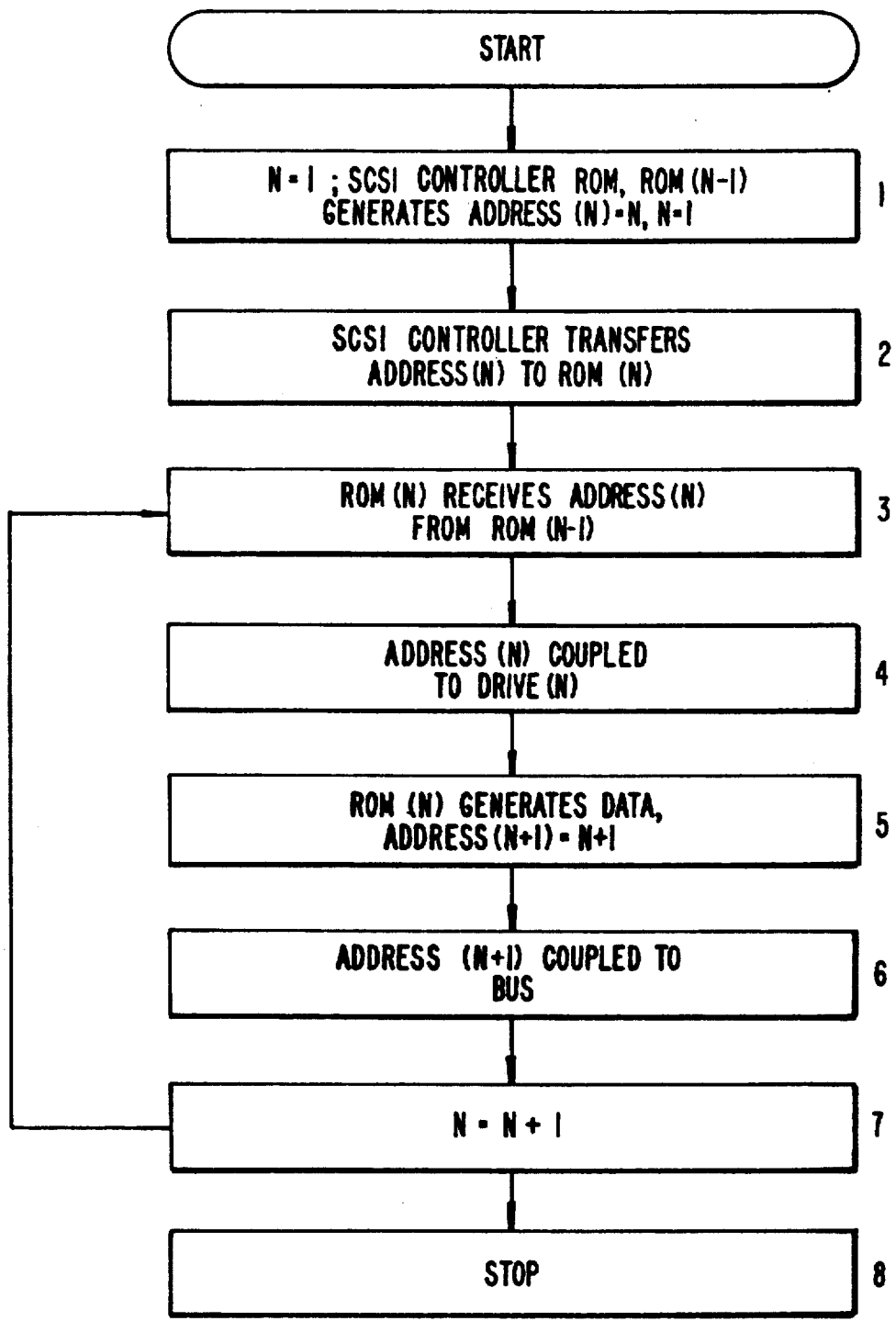
FIG._6.

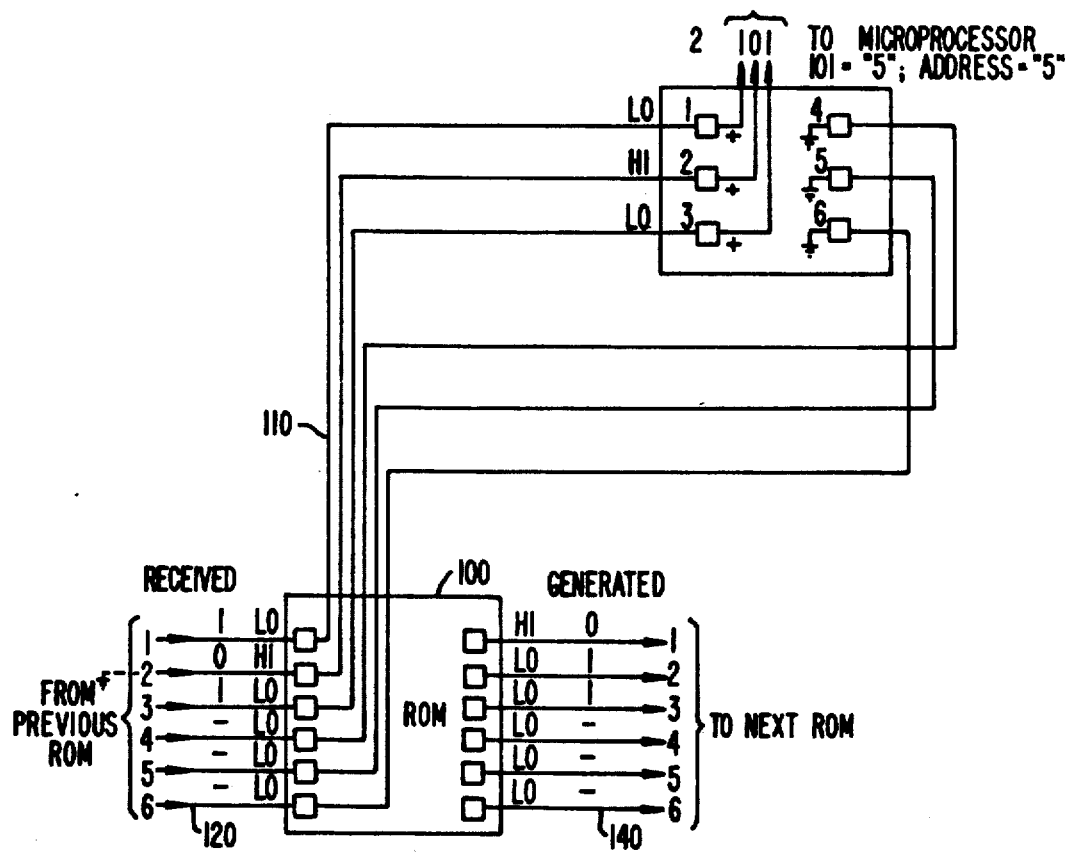
FIG._7.
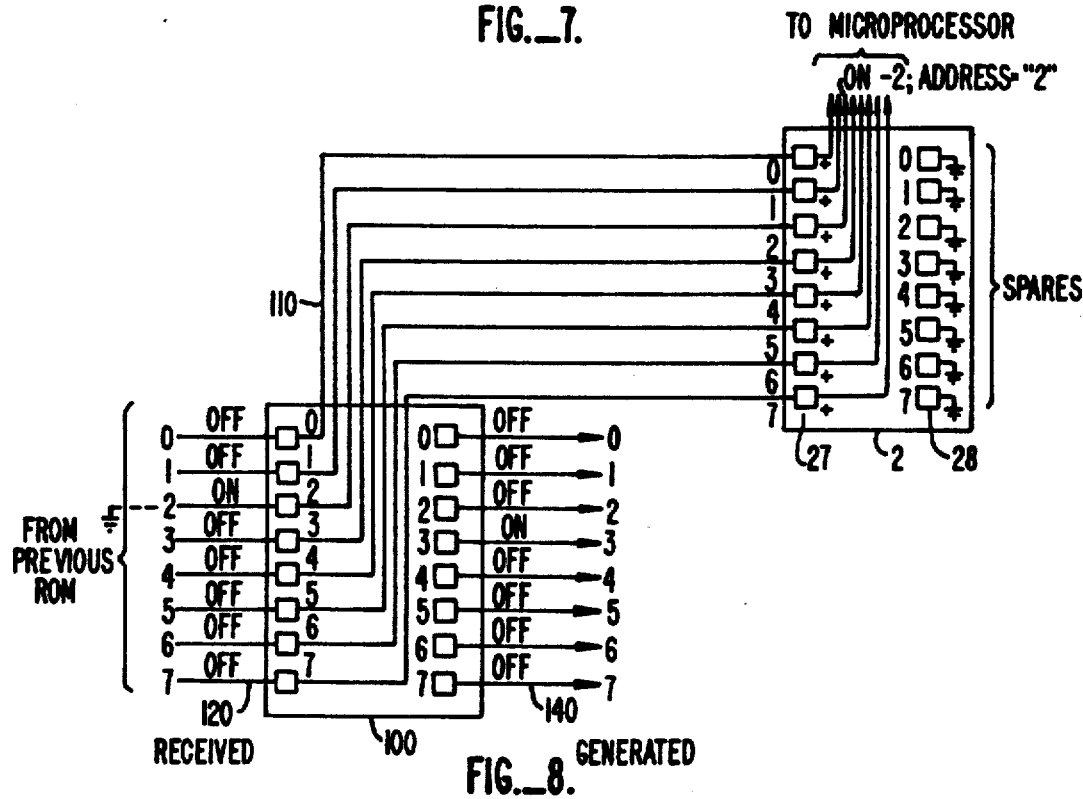
FIG._8.

MODULAR EXPANSION BUS CONFIGURATION

BACKGROUND OF THE INVENTION

This invention relates to computer systems in which peripheral units are interconnected with a CPU via an input/output bus and particularly relates to an expanded computer system having a plurality of modular units serially connected to a main bus and an expansion bus.

Many computer systems are known which employ a large number of modular units for attaching to a main bus and to an expansion bus. Moreover, with the increasing popularity of computers for business, office, and home uses, the trend for design of popular computer systems has been to simplify the basic function performed by each modular unit so as to permit the modular units to be easily added to an existing computer bus.

Refer now to FIG. 1. FIG. 1 shows a conventional, expanded computer system having a main bus 80 and an expansion bus 70. Connected to the main bus 80 is a system controller 10 and a plurality of processors 12, 14, etc., which terminate in a controller module 20. In this configuration, the controller module 20 is itself connected to an expansion bus and is followed by a plurality of serially connected storage units 30, 40, 50 and 60.

One of the problems encountered in using the expanded modular computer system as shown in FIG. 1 has been the problem of identifying the storage units attached to the expansion bus. As an illustration, refer to FIG. 2.

FIG. 2 shows a simplified diagram of a typical modular unit 202 as it appears when physically connected to the expansion bus. Modular unit 202 would include drive unit 5 attached to a mother board 8. Mother board 8 would be connected to adjacent modular units by input header 7 which is coupled to drive 5 by a plurality of trace lines 6. Within the drive 5, is a microprocessor 1 which is coupled to an ID header 2 by internal lines 4. The ID header 2 is in turn provided with a plurality of ID pins 3 which serve to provide the address for the modular unit shown in FIG. 2.

One problem in the prior art for the unit shown in FIG. 2 is that the ID headers do not come with the identification pins preconnected. Thus, it has been necessary for the end user to provide jumpers to connect the pins in the ID headers as shown in FIG. 3 to provide the unit with an address. By selectively connecting the identification pins 3, the end user is able to simulate digital bits which serve to identify the address for the particular module. Thus, in the example shown. FIG. 3, a 011 jumper configuration would indicate that the particular module had an address of "5".

Several problems are encountered in this arrangement. First, the ID headers are typically located deep within a recess in the drive housing and it has been very difficult for an end user to physically obtain access to the ID pin to provide the desired jumper connection. In order to make the proper jumper connections, it has been necessary to either insert fingers deep inside these recessed areas or to actually take the drive unit apart. Also an unsophisticated end user might have absolutely no knowledge of the need to jumper the identification pins, and might experience difficulty in conveniently locating the pins even if aware of the need to provide some identification scheme at the point of end use.

An additional inconvenience is that the end user must remember the jumper configuration from module to module in order to avoid accidentally giving two modules the same ID number. Finally, by using this particular identification technique, once an individual user identifies a module with a particular address, the user would be required to rejumper the ID pins in order to provide the module with a new address or to place the module at another address along the bus that was already identified with another module.

Moreover, it is well known that there are practical limits to the distances that modules can be attached from a main system controller when connected to a controller by a bus. Thus, a problem arises as to devising an automatic addressing method whereby the storage units which are attached to the expansion bus can be properly identified without relying on the main system controller.

SUMMARY OF THE INVENTION

The invention comprises an automatic, self addressing technique for assigning addresses to modular units connected to a computer system bus. In its broadest aspect, the invention comprises the method of initially generating a unique address in a controller module and thereafter transferring the unique address to the next expansion module. The expansion module receives the unique address, is identified by the unique address, and generates a new unique address using the received unique address. Thereafter the expansion module transfers the newly generated address to the next expansion module which likewise uses the received address to identify itself. The foregoing steps are repeated until each expansion module has been identified by a unique address.

In the preferred embodiment, the unique address is provided by coupling grounding signals to the identification pins. A Read Only Memory (ROM) is used to receive the unique address and to generate a new address to be transferred to the next module. A cable is used to connect the received unique address to the ID pins. By providing the addressing features in accordance with the invention, the problem of providing an address for a plurality of interchangeable expanded module units has been greatly resolved. No particular technical skill is required in order to connect a plurality of modular units to a bus, and the units will be automatically uniquely addressed irrespective of their place along the expansion bus. Modular units may be interchanged and will still be uniquely addressed. The arrangement may be configured whereby the main controller coupled to the main bus is not essential to the identification scheme.

For a fuller understanding of the nature and advantages of the invention, reference should be had to the ensuing Detailed Description taken in conjunction with the accompanying drawings.

BRIEF DESCRIPTION OF THE DRAWINGS

FIG. 1 is a block diagram of a modular computer system having an expanded bus in accordance with the prior art.

FIG. 2 is a schematic diagram of a drive unit showing an addressing scheme in accordance with the prior art.

FIG. 3 is an enlarged view of the ID header for a modular unit in accordance with the prior art.

FIG. 4 is a block diagram of a modular unit in accordance with the invention.

FIG. 5 is a simplified block diagram illustrating the inputs and outputs to a ROM used in accordance with the invention.

FIG. 6 is a flow chart illustrating the addressing steps in accordance with the invention.

FIG. 7 is a detailed diagram of one specific embodiment of a ROM circuit connected to the ID pins in accordance with he invention.; and FIG. 8 is another detailed diagram for the ROM circuit connected to the ID pins in accordance with the invention.

DESCRIPTION OF THE PREFERRED EMBODIMENTS

Refer now to FIG. 1. As previously explained. FIG. 1 is a block diagram of a modular computer system having a main bus 80 called an X bus and an expansion bus 70, in this case, an SCSI bus. The main system controller 10 is connected to the main bus 80, followed by a plurality of serially connected processor modules 12, 14 and 20.

Processor module 20, in the example shown in FIG. 1, comprises an SCSI controller module and serves to terminate the main bus. An expansion bus 70 is connected to the SCSI controller module 20. A plurality of serially connected expansion modules consisting of storage modules 30, 40, 50, and 60 are coupled to the expansion bus following the SCSI controller 20.

In actual practice, the processor modules coupled to the main bus would be, for example, voice, communication or other such processors, whereas the storage modules connected to the expansion bus would typically comprise disk, optical or tape type storage devices.

In many applications, the maximum distance that a module can be located on the main bus from the system controller is 24 inches. In many configurations, the processor modules and the system controller are interconnected to each other using a 120 pin connector device.

As previously explained, problems inherent in the system, as shown in FIG. 1, include there being a maximum distance permissible for extension from the system controller and there being a need for some scheme to identify the modules connected to the system controller to eliminate command ambiguities.

Typically as shown in FIG. 1, an SCSI controller module would terminate the main bus and would have coupled to it an expansion bus having a plurality of storage modules coupled thereto. The SCSI controller module serves to extend the operation of the main bus in that the signals are not propagated from the main bus to the storage devices on the expansion bus but signals are transferred from the SCSI controller down the expansion bus to the storage units.

Refer now to FIG. 2. As previously explained. FIG. 2 depicts a typical module. Shown in FIG. 2 are lines 70 from an SCSI controller which terminate in a 44 pin connector 7A at the output side of a previous mother board 8A. Connector 7A is coupled to the input side of motherboard 8 via 44 pin connector 7. Mother board 8 has located thereon a main drive unit 5. The 44 pin connector 7A is coupled to the input of drive unit 5 by a plurality of trace lines 6. The output of drive unit 5 is coupled to an output 44 pin connector 7B by output trace lines 6B. Drive unit 5 includes mini microprocessor 1, an ID header 2, and ID pins 3 within ID header 2. ID header 2 is coupled to the microprocessor by an internal communications line 4. The connectors, trace lines, and other input/output means form part of the SCSI bus.

Refer now to FIG. 3. As previously explained, FIG. 3 depicts the ID header and the ID pins included therein. ID pins 3 include one column of pins adjacent another column of pins.

As shown in FIG. 3, one column 24 of ID pins is configured such that each pin is coupled through a resistor to a positive voltage. Further, lines 4 tap from the resistors to the microprocessor. Thus, in normal operation, the lines 4 from ID pins in column 24 would provide a positive voltage to microprocessor 4. On the other hand, ID pins in column 23 are coupled to ground. Thus, in order to simulate a zero for the ID pins shown in FIG. 3, jumpers have been used to connect selected pins in column 23 to selected pins in column 24, to thereby short selected pins to ground. By selectively jumpering pairs of pins, the prior art technique has permitted identification of modules by simulating 1's and 0's in the microprocessor. Microprocessor 1 has therefore been able to determine the address for the modular unit by translating the digital representation of the bits provided over communications line 4. In the example shown in FIG. 3, by shorting the top most row of pins to provide a 0 and leaving the bottom rows of pins unshorted, a digital 011 signal is provided to microprocessor. 1 which serves to identify the modular unit as unit number 5.

As previously explained, several problems have arisen from the foregoing scheme. First of all, there is a physical problem of gaining access to the ID pins, since in most instances the ID pins are deeply recessed in the ID header. Next, an unskilled user of the modular unit might have no knowledge whatsoever of the need to properly identify the modular unit prior to inserting the module on a computer bus having a plurality of modules coupled to a bus.

Next, once the modular address has been set, before the modular unit can be used in another serial location within the expanded bus, it is necessary to remove the jumpers already placed thereon and configure the jumpers so as to provide a new ID corresponding to the new serial location.

Accordingly, it can be said that one problem of the above configuration is that it limits the fungibility of modular units. This problem could be solved somewhat by placing jumpers on the modular units when the units are manufactured. However, a resulting problem is that the units would be committed to the serial location as placed thereon by the manufacturer and would again not have the flexibility to be located at any point along the expansion bus.

Refer now to FIG. 4. FIG. 4 shows a modular unit in accordance with the invention. Shown in FIG. 4 is modular expansion unit 200 which comprises a mother board 8, a drive unit 5, an ID header (connector) 130 and trace lines 6. Connector 130 is a 44 pin connector and couples the input side of mother board 8 to the output side of the previous motherboard in an adjacent modular unit on the expansion bus. Trace lines 6 couple the input header 130 to the drive unit 5. Output lines 9 couple the drive unit 5 to an output header 180. Lines 70 represent input lines from an adjacent previous module such as a SCSI controller. Line 90 represents output lines to the next SCSI module such as a next storage unit.

FIG. 4 also shows a plurality of trace lines 120 that are coupled from the input header 130 to ROM 100.

Cable 110 is coupled from connector pins (not shown) on ROM 100 to ID pins 3 in drive header 2. Drive header 2 is coupled to microprocessor 1 by an internal communication line 4.

Refer now to FIG. 5. FIG. 5 is a simplified block diagram of the ROM circuit 100 included in the modular expansion unit in accordance with the invention. ROM circuit 100 receives an address signal. ADDRESS(N). which is coupled to the input of ROM 100 from input header 130 by trace lines 120. The ADDRESS(N) signal is coupled through cable 110 to the ID header and the ID pins. ROM unit 100 takes the address signal provided thereto via trace lines 120 and generates a new data output which is the address for the next expansion module unit. In the preferred embodiment, the address generated is merely ADDRESS(N) plus 1.

Refer now to FIG. 6 which shows a flow diagram of the steps in accordance with the invention. As shown in FIG. 6 the method starts when a ROM in the SCSI controller gene an ADDRESS(1) equal to 1. The controller ROM would next transfer the address to the ROM unit in the next adjacent, serially connected expansion module via the connectors and trace lines. Next, the ROM on the receiving module, ROM(N), would receive ADDRESS(N) from the ROM in the previous expansion module. ROM(N) would thereby transfer the ADDRESS(N) to the drive(N) via the cable coupled from pins on the ROM to the ID pins in the ID header, and thereafter through the internal communication line to the microprocessor in the drives(N). Also, ROM(N) would use ADDRESS(N) to generate a data output. ADDRESS(N+1), which is provided as the address for the next adjacent, serially connected, expansion module unit. In the preferred embodiment, the address for the next unit is simply the address provided for the instant ROM(N), plus 1. For example, if the address provided to the ROM unit were 2, then the address provided out would be 3.

ADDRESS(N+1) is thereafter coupled from the output side of ROM(N) by a plurality of trace lines, which form a part of the expansion bus, to the output header. The output header for the Nth module couples the new address, ADDRESS(N+1). to the input header of the next adjacent mother board. The foregoing steps of receiving the address, coupling the address to the module microprocessor, generating a new address, and transferring the new address to the next module would be repeated until each expansion module had been provided with a unique identification.

Refer now to FIG. 7 which is a detailed block diagram of one embodiment of the invention. The purpose of the configuration shown in FIG. 7 is to provide to the microprocessor in the drive unit an address identifying the module as unit 5.

Refer to the ID header 2 shown in FIG. 7. The Id header has therein. 6 ID pins: voltage connected pins 1, 2, 3 and grounded pins 4, 5 and 6. The configuration according to the invention no longer requires that jumpers between adjacent pins provide the digital ID to the microprocessor, so that it is no longer required that pins. 4. 5 and 6 be utilized. According to the invention, instead of providing jumpers to simulate 1's and 0's, grounding signals are provided to selected pins using the input signals provided to the ROM on lines 1, 2 and 3.

Input lines 4, 5 and 6, therefore, are in the nature of spare lines and are not necessarily needed in the configuration shown in FIG. 7. Thus, the problem of providing an address of "5" according to the embodiment in FIG. 7 is a problem of simulating to the microprocessor a 1, a 0 and a 1 without having to provide jumpers to physically ground pins 1. 2 and 3. In accordance with the invention, this problem is solved by providing grounding signals along selected input lines to the ROM. Input line 1 is provided with a 1 signal which in this instance is a low signal which serves to leave line 1 at the high voltage level. Input line 2 to the ROM is provided with a 0 signal which is a high (grounding) signal which serves to drive pin 2 in ID header 2 to ground. Line 3 is provided with a 1 signal, or a low signal, which serves to leave pin 3 in ID header 2 at a high level. Thus, by driving pin 2 in ID header to ground, the necessary "101" binary digits are simulated and the microprocessor in the unit recognizes that its address is 5.

ROM 100 also takes the "101" address and processes these signals to generate an output signal that is to be used as the address for the next ROM. Since in this instance the input signal was 5, the output signal provided is 6 so that the next adjacent unit would be addressed at one higher than the instant ROM unit.

Since the digital representation for 6 is 011, in this configuration, ROM 100 provides as output for line 1, a 0; for line 2, a 1; and for line 3, a 1. Thus, the signal provided on line 1 will be a grounding signal to drive pin 1 in the ID header in the next module to ground.

Refer now to FIG. 8. FIG. 8 depicts another ID configuration in accordance with another embodiment of the invention. In FIG. 8, the ID header is provided with 16 ID pins, consisting of two columns, 27 and 28, of 8 pins each. In the configuration shown in FIG. 8, the grounded pins in column 28 are used as spares and need not be used in accordance with the invention.

In the prior art, the ID pins in FIG. 8 are not used to provide to the microprocessor a digital representation of the module address. Rather, the address is determined based solely on which particular pin in column 27 is coupled to ground by jumpering to a corresponding pin in column 28. For example, if pin 1 of column 27 in the ID header is jumpered to a ground pin in column 28, the address for the unit in FIG. 8 would thereby be designated as "1". Similarly, if the 4 pin were connected to ground, that would indicate that the address for the unit using the ID header in FIG. 8 would be a 4. Thus, the problem solved according to the invention for the embodiment shown in FIG. 8 is the problem of simulating a ground at the particular pin that is to identify the address for the particular drive unit.

As shown in FIG. 8. ROM 100 has connected to its input side a plurality of input lines 120, numbered 0 through 7 and has connected to its output side a plurality of output lines 140, numbered 0 through 7. Lines 120 couple an address signal received from the previous ROM to ROM 100. Output lines 140 couple a new address signal generated by ROM 100 to the output header. Assume, as shown in FIG. 8, that the address for the modular unit in FIG. 8 is to be "2". In the prior art, it would have been necessary to jumper ID pin 2 in the ID header to ground in order to simulate an address of "2".

According to the invention, an "on" signal would be provided on line 2 which would be coupled to pin 2 of column 27 on the ROM. This "on" signal would be coupled from pin 2 on the ROM to the number 2 pin of column 27 in the ID header. The effect of the "on"

signal is to drive the voltage at pin 2 of column 27 in the ID header to ground, thus simulating the jumpering arrangement. Because the voltage at ID pin 2 is driven to ground, the microprocessor recognizes that the address for the module is 2.

The ROM would take the received address which comprises an "on" (grounding) signal on line 2, would process that information, and would generate an addressing signal for the next adjacent ROM. Thus, in this instance, since line 2 is received in the "on" condition the ROM would generate an on signal on line 3, thereby causing the next serial module to be addressed as address 3.

This daisy chaining scheme will be continued until each module had been provided a unique address.

The foregoing embodiments of the invention take advantage of the fact that the prior art connector pins had provided to the modular expansion units more ground pins than were actually needed for operation of the modular units. Thus the invention, as disclosed in the embodiments shown in FIG. 7 and FIG. 8, is able to provide the automatic self addressing scheme without requiring any additional wiring than presently provided in the prior art. It is noted that for the arrangement in FIG. 7 and FIG. 8, the modules and system must be capable of continuously driving the ID pins to ground.

The ROM used in accordance with the invention is a mailbox type ROM wherein an address is supplied as an input into the ROM and data is automatically supplied as an output from the ROM. In actual operation, an address is provided on the input side of the ROM which is translated to a mailbox inside the ROM. The ROM automatically takes data inside the mailbox and provides that data as the output address for the next adjacent ROM. The mailboxes are preassigned through a conventional fuse link process. According to the invention shown in the embodiments of FIG. 7 and 8, the input addressing signal must be provided continuously through the ROM's.

In the preferred embodiment shown in FIG. 8, the voltage used to drive the pins to ground is typically in the range of 5 volts. The low and off voltage signals would typically be 0 volts. By reassigning unused ground pins and lines, the invention has avoided the necessity of including additional wiring.

Thus it can be seen that the invention provides a number of advantages over the prior art.

It is unnecessary to dedicate any one modular unit to any serial place along the expansion bus but according to the invention, a modular unit may be placed at any location along the bus so long as all the units along the bus are provided with the same automatic addressing scheme.

Given the arrangement according to the invention, each unit will automatically be addressed according to an input signal and will generate an address to be provided to a next module that is one more than the address received by that particular module.

Further, using the configuration according to the invention, the physical problem of trying to jumper into recesses has been avoided. The cable hook-up from the ROM to the ID headers is provided as a standard part of the configuration package.

In addition to the foregoing, the invention provides a scheme that permits automatic, unique addressing of expansion modules without relying on the main system controller. Thus, the invention facilitates expanding the length of modular computer systems by providing a means for uniquely identifying modular units beyond the maximum operating length of the main system controller.

The invention has now been explained with reference to specific embodiments. Other embodiments including realizations in hardware and realizations in other preprogrammed software would be apparent to those of ordinary skill in the art. It is therefore not intended that the invention be limited except as indicated by the appended claims.

I claim:

1. A modular computer system comprising:
    a controller module;
    a bus connected to said controller module;
    a plurality of serially connected expansion modules coupled to said bus following said controller module,
    each said expansion module having address input means for receiving a bus address from a preceding module, means for generating a next module address from the address supplied to the address input means, and address output means for supplying the next module address to the bus for receipt by a next succeeding module,
    said controller module including means for generating the bus address of a first one of said plurality of serially connected modules, and address output means for coupling the first module address to the bus for receipt by said first one of said plurality of serially connected modules whereby the address of the first one of said modules is generated by said controller and the addresses of the remaining ones of said expansion modules are each generated by a preceding expansion module.

2. The invention of claim 1 wherein said means for generating the next module address includes a memory device.

3. The invention of claim 2 wherein said memory device comprises a read only memory unit having an address input terminal coupled to said expansion module address input means and an output terminal coupled to said expansion module address output means.

4. A module computer system comprising:
    a system controller;
    a main bus coupled to said system controller;
    a plurality of serially connected processor modules coupled to said main bus;
    an expansion controller module coupled to one of said processor modules;
    an expansion bus coupled to said expansion controller module; and
    a plurality of serially connected expansion modules coupled to said expansion bus,
    each said expansion module having address input means for receiving a bus address from a preceding module, means for generating a next module address from the address supplied to the address input means, and address output means for supplying the next module address to the bus for receipt by a next succeeding expansion module,
    said expansion controller module including means for generating the bus address of a first one of said plurality of serially connected expansion modules, and address output means for supplying the first expansion module address to the expansion bus for receipt by said first one of said plurality of serially connected expansion modules, whereby the address of the first one of said expansion modules is generated by said expansion controller module and the address of each remaining one of said expansion modules is generated by a preceeding expansion module.

5. The invention of claim 4 wherein said means for generating the next module address includes a memory device.

6. The invention of claim 5 wherein said memory device comprises a read only memory unit having an address input terminal coupled to said expansion module address input means and an address output terminal coupled to said expansion module address input means.

7. A method of assigning a bus address to each expansion module in a computer system having a controller coupled by an expansion bus to a plurality of serially coupled expansion modules, said method comprising the steps of:

(a) generating in the controller an address for a first expansion module in the system;

(b) supplying the address for the first expansion module from the controller to the first expansion module;

(c) generating at the first expansion module an address for a next module from the address supplied to the first module;

(d) supplying the address generated in step (c) to the next module;

(e) generating at the next module an address for a subsequent module from the address supplied to said next module;

(f) supplying the address generated in step (e) to the subsequent module; and (g) repeating said steps of (e) generating and (f) supplying at successive modules until all modules have been supplied with an address.

8. The invention of claim 7 wherein each expansion module includes a subsequent module address generator; and wherein said step (d) of generating is performed by causing the subsequent module address generator in said next module to generate said subsequent module address from the address supplied in step (c).

* * * * *